TUNER SLUG COUPLING

Filed Dec. 15, 1950 2 SHEETS—SHEET 1

INVENTOR.
Reuben C. Carlson
BY
J. H. Douglas
His Atty

Feb. 17, 1953 R. C. CARLSON 2,629,080

TUNER SLUG COUPLING

Filed Dec. 15, 1950 2 SHEETS—SHEET 2

INVENTOR.
Reuben C. Carlson
BY
J. W. Douglas
HIS ATTY.

Patented Feb. 17, 1953 2,629,080

UNITED STATES PATENT OFFICE 2,629,080

TUNER SLUG COUPLING

Reuben C. Carlson, River Grove, Ill., assignor to Admiral Corporation, Chicago, Ill., a corporation of Delaware Application December 15, 1950, Serial No. 200,957

7 Claims. (Cl. 336—136)

This invention relates to improvement in tuning controls for radio receivers, and more particularly to a control useful in conjunction with so-called "slug" or permeability tuning receivers.

As is well known to those versed in the art, it is common practice to tune radio cricuits by changing the effective value of the inductance in one or more parts of the circuit. For example, the inductance may be changed by moving a copper slug, sleeve or an iron core or sleeve, or both, into or in proximity to the inductance to increase or decrease the magnetic field flux path or vary the permeability of the field in or around the core.

A common mode of carrying out the foregoing practice is to employ an inductance provided by a helix of wire wound on a cylindrical coil form within which a slug may be moved, the slug and helix thus affording a single variable inductance unit. The inductance value of a plurality of such units, which are mechanically associated with each other, may be concurrently tuned by associating the helices in fixed relationship to each other by connecting them to a single stationary support. At the same time each of the units may be connected in different circuits, such as one or more radio frequency stages, an oscillator stage, or a detector stage, all of which is known to those versed in the electronics art. The slug members of each of the units are also coupled to a movable member or cross-head with respect to which each of the slugs may be adjusted. The previously mentioned stages may be simultaneously tuned, since the units are "ganged" together as disclosed in copending application of John L. Altman and Edward W. Swanson, Ser. No. 741,970, filed April 17, 1947.

Another prior construction of control for moving gang-coupled units involves a lever coupled to the cross-head at either end thereof. As a result of such a construction the adjustable coupling, for the slugs at the cross-head, is movable in an arc thereby causing undesired bending of the connecting wires on the slugs as they are moved axially of the coils. Furthermore, the known means of coupling the slugs to a cross-head were comparatively expensive.

By the present invention, I have made a coupling for slugs with a cross-head or other support wherein the individual slugs may be readily adjusted by simple means, and the connection of the slug to the support is such that undue strains on the wires which carry the slugs are removed. Furthermore, the coupling afforded by the present invention is less expensive than corresponding couplings known to the prior art.

For a further and better understanding of the invention besides one manner in which it may be carried out, reference may be had to the accompanying drawings in which.

Figures 1, 2, 3, 4, 5, 6:
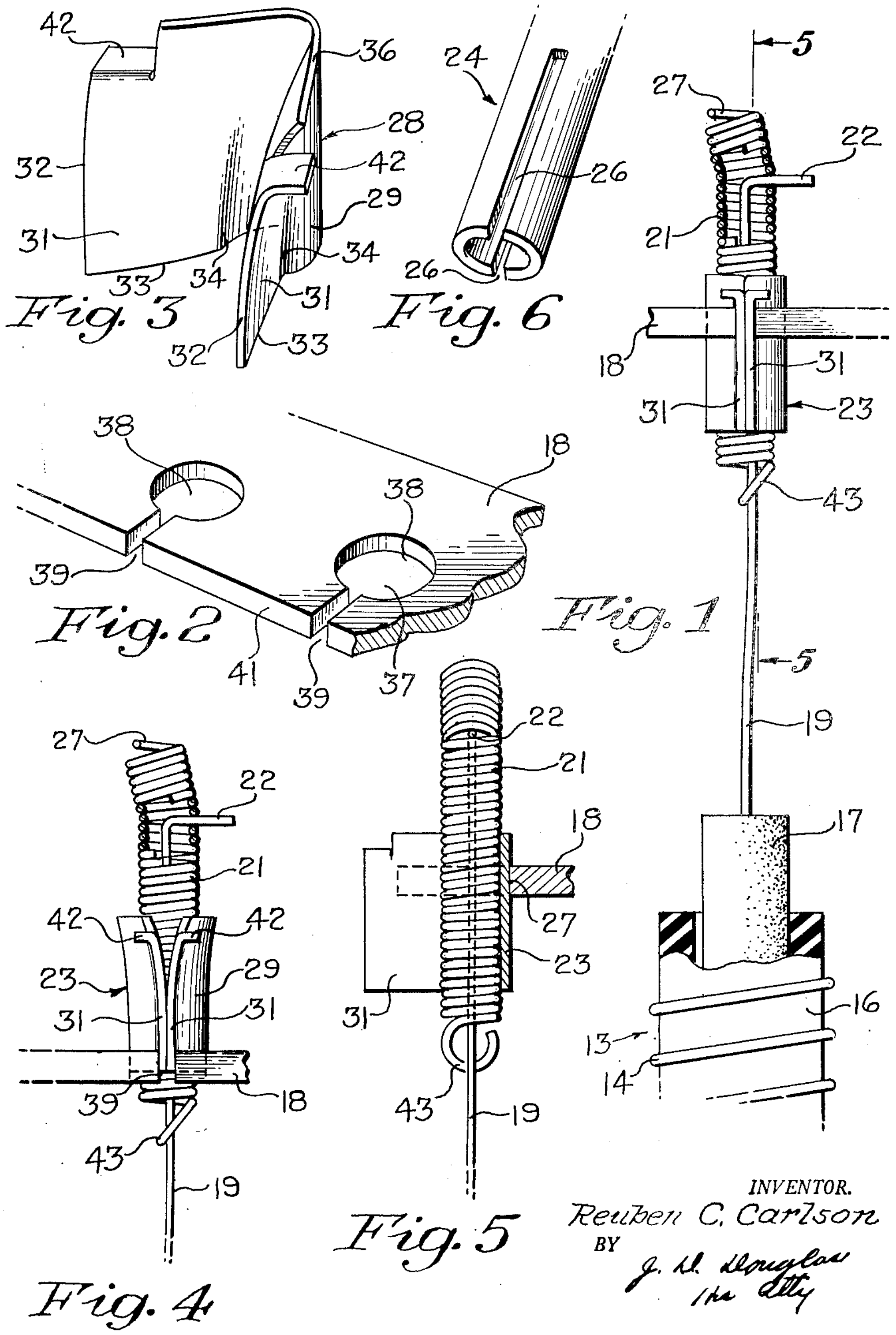
Fig. 1 is a fragmentary elevational view of a tuning unit with which the invention is in association.
Fig. 2 is a fragmentary perspective view of the cross-head to which the tuning slugs are adapted to be attached.
Fig. 3 is a perspective view of the fastener element.
Fig. 4 is a fragmentary elevational view of elements of the invention in the process of being assembled.
Fig. 5 is a fragmentary sectional view on line 5—5 of Fig. 1.
Fig. 6 is a fragmentary perspective view of the end of a wrench for varying minutely the position of the slug with respect to the cross-head.

The apparatus shown in Fig. 1 includes a fixed inductance indicated by the character 13. It comprises a helix of wire 14 wound on a conventional coil form 16 of suitable insulating material. The inductance value of coil 13 is fixed but is adapted to be varied by longitudinal movement of a tuner slug 17, within the coil form, the slug having a leader 19 in axial extension therefrom by which it may be anchored to a movable member or cross-head 18 by means later to be described. The cross-head 18 may move any number of slugs similarly anchored to it to vary the value of additional inductances in separate circuits. But the value of the respective inductances, in association with cross-head 18, are not necessarily equal and in most cases will be unequal. Therefore, it is advisable that each of the slugs be adjustably coupled to the cross-head so that the position of each individual slug in its coil may be adjusted to tune each circuit properly.

The means, by which the leaders 19 depicted in Fig. 1 are anchored to the cross-head 18, is simple and believed novel. It comprises a spiral or spring 21, an arm, hook or handle 22 extending between the convolutions of said spring from the leaders 19, radially thereof, and a substantially yieldable fastener 23 to embrace the spring for coupling the same to the cross-head. Although any suitable arm formation laterally of the leader may be employed, probably the most simple structure may be provided by bending the free end portion of the leader 19 laterally so that an integral part of the leader itself extends between the convolutions.

As indicated, the spiral 21 may take the form of a spring, and it may be of some resilient metal such as steel piano wire. A suitable size spring may be formed of such wire .020 inch in diameter. A coil .109 inch in over-all diameter and approximately ⅝ inch in length of this size wire is satisfactory. This size spring may be used with a leader 19 which measures about .015 inch in diameter. These sizes are only illustrative. However, it will be apparent that the diameter of the spiral 21 should not be too large, for then the arm 22 will necessarily be long to avoid slipping out from between the convolutions of the spring.

The convolutions of the spring 21 are in abutment with each other so that when the arm 22 is extended between adjacent convolutions, the arm is pinched thereby, and normally there is sufficient friction between the convolutions and arm to resist angular displacement of the latter about the axis of the spring. The pinching operation is not sufficiently great, however, to resist manual rotation of the leader by turning the arm 22. A more convenient manner by which this may be carried out is by means of a tool 24 (Fig. 6), one end of which is tubular and is diametrically divided by a pair of slots 26 extending longitudinally of the tool, either of the slots being adapted to engage arm 22 when the tool is slipped over the spring. Rotating the leader, as indicated, therefore varies minutely the proximity of the slug 17 to the spring 21.

As a convenience in assembling the arm 22 and the spring 21, an end 27 of said spring diverges from the adjacent convolution. This enables the arm 22 to cam the first two of the convolutions apart as it is forced therebetween.

The structure of one type of fastener, clip or intermediate member 23, prior to its association with the spring 21, is shown in Fig. 3. It is constructed of comparatively soft, thin sheet metal such as copper, brass or aluminum which is slightly resilient. Suitable samples have been made from sheet copper .010″ in thickness. This grade of metal readily lends itself to shear and forming by a power press into a blank or structure 28 as indicated. It will be noted that the blank comprises, transversely thereof, a particylindrical anchor portion 29 from either side of which wing portions 31 extend to free side edges 32. The edges extend to an end edge or lower edge 33 where the distinction between the wing portions 31 and anchor portion 29 is sharply defined by abrupt bends 34 in the fastener. From the end 33 the bends 34 become decreasingly less distinct toward an upper edge 36, opposite the end 33. The bent regions 34 may even disappear short of the upper edge, as shown. The purpose of this form is to enable the blank 28 to be additionally deflected, usually manually, at the anchor portion 29 so that when it is wrapped about the helix 21 the lower edge may be inserted in a key-hole shaped aperture 37 in the cross-head 18 (Fig. 4). The cross-head is thus apertured by as many openings as there are inductances. In detail, the aperture 37 includes a bore 38, to accommodate the edge 33 of anchor portion 29, and a slot 39 between the bore and edge 41 of the cross-head, for reception of the wings 31. Although it is necessary to pinch the wings together to insert the fastener into the aperture 37, the wings, when so pinched, meet only in the proximity of the lower edge 33, as will be noted in Fig. 4. This is because the wings diverge curvilinearly from each other from the lower edge 33 when the fastener is embracing spring 21 as in Fig. 4. Also, although it may be necessary to bend the blank 28 beyond its limit of elasticity for it to embrace the spring as shown, the metal from which the clip is made is of such a quality that removal of said clip from cross-head 18 would be followed by the wings springing apart slightly.

A second operation must be performed in order to anchor the slug to the cross-head. It involves pressing the fastener downward into the aperture 37. This is usually carried out manually and in the course of the operation, that portion of the cross-head which defines the mutilated aperture 37 acts as a forming die, since it progressively extends the wrap and increases the intimacy of engagement of anchor portion 29 about spring 21 as it is carried through the aperture. As a convenience for use in the operation of forcing it into aperture 37 while it is embracing the spring, the fastener may be provided with one or more handles or tabs 42 preferably in extension from the region of the edge 36. The tabs may be on the anchor portion 29 or, as shown, on the wings 31 and may be an integral part of the fastener. These tabs provide seats against which pressure for the forming operation may be exerted.

When the fastener is pressed into the aperture 37 for a distance adequate to anchor the spring 21 thereto, the fastener is also frictionally coupled to the cross-head. This is augmented by the resiliency of the fastener and consequent pressure of the same outward against the walls of the bore 38 and slots 39. Because of this relationship between fastener 28 and cross-head 18, it will be understood that the fastener may be operatively positioned at a variety of levels with respect to the cross-head. Consequently, in anchoring it to the cross-head, the slug is first approximately positioned by forcibly positioning the fastener in the cross-head and then by rotating the arm 22 about the axis of spring 23 the slug may be finally tuned to its exact position.

At the end of spring 21 remote from the end bearing the guide portion 27, a biasing portion 43 is formed. It is provided by a looped partial convolution of the spring which is in a plane which is inclined at an angle of less than 90 degrees from the plane of the convolution adjacent thereto. This angle, in a device made according to the above mentioned dimensions, may be approximately 45 degrees. The portion 43 is in engagement with the leader 19 to bias slug 17 constantly against one side of the interior of the coil form 16 (Fig. 1) as a measure for reducing irregularities in the operation of varying the value of inductance 13.

However, this biasing of the slug 17 uniformly against the interior of coil form 16 is subject to difficulties. For example, if too long a portion of spring 21 is extended out of the lower end of fastener 23, the biasing tendency of the spring will be inadequate to press the slug uniformly against the interior of the coil form, whereas there will be too much friction between the slug and coil form if there are too few convolutions below the fastener. Accordingly, it is preferable that in the case of anchorate apparatus of the quality and proportions previously referred to, best results attended use of about three free convolutions below the level of the fastener 28.

Figures 7, 8, 9, 10:
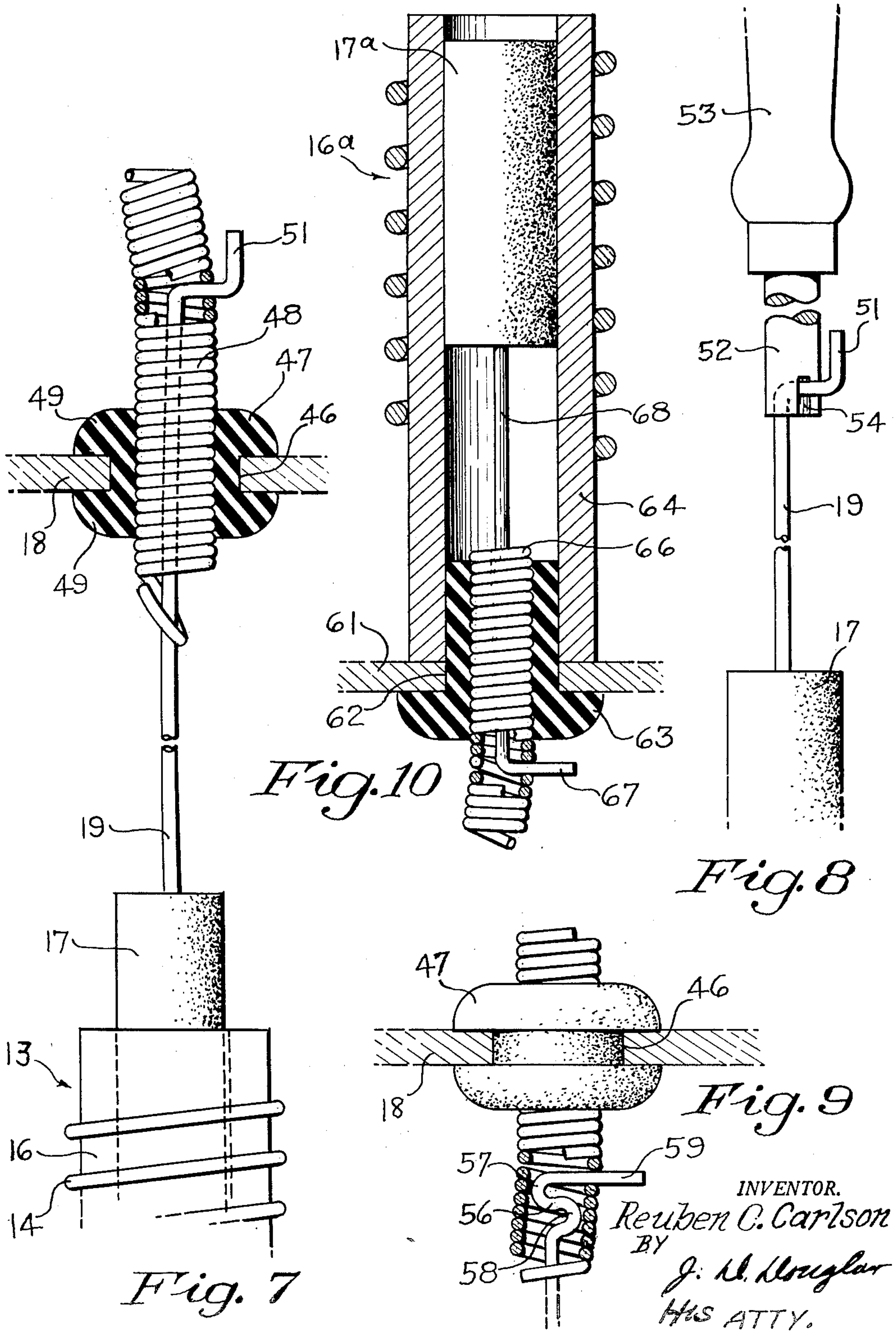
Fig. 7 is a fragmentary elevational view of a second embodiment of the invention.
Fig. 8 is a fragmentary elevational view showing the kind of tool which is adapted to adjust the slug with respect to the cross-head shown in Fig. 7.
Fig. 9 is a fragmentary elevational view of a third embodiment of the invention.
Fig. 10 is a vertical sectional view of a fourth embodiment of the invention.

A second embodiment of the invention is illustrated in Fig. 7. It involves use of the previously mentioned elements including inductance 13, slug 17, leader 19 and cross-head 18. The cross-head is apertured by an opening 46, suitable for accommodation of a rubber grommet 47 which is adapted to be pinched between the cross-head and a spring 48 to anchor the slug 17 to cross-head 18. If desired, the grommet may be provided with spaced-apart annular flanges 49 which embrace the sides of the cross-head. In this embodiment, the spring 48 may preferably be of diameter larger than the diameter of spring 21, and also made from a heavier gauge of wire. The leader 19 may include, besides the arm portion 22, a finger 51 extending parallel to the leader 19 to engage the periphery of spring 48 and resist slipping of the arm portion backward within the coil and the slug out of anchored relationship thereto.

A suitable tool for regulating the spacing of slug 17 from the spring 48 may take the form of a rod 52 (Fig. 8) supported by a handle 53. The rod 52 is adapted to be inserted within the spring and has a slot 54 in which the arm 22 may be received.

If desired, the header 19 may be bent to an S-shaped configuration as at 56 (Fig. 9) adjacent its end to provide stop portions 57 and 58 adapted to be in intimate association with the interior of the spring as means to resist shifting of the leader 19 transversely of said spring while adjacent convolutions thereof retain an arm portion 59 therebetween.

Another embodiment of the invention as shown in Fig. 10 involves anchorage for a slug 17*a* while it additionally affords support for an inductance 16*a*. In detail, a cross-head 61 is apertured at 62 to receive a flanged bushing 63 of some suitable resilient material such as rubber. The bushing further extends into a coil form 64 between which, and the cross-head, the bushing is squeezed by a spring 66. The coil form 64 is thus anchored to the cross-head 61 by the bushing 63 and spring 66.

In assembly of this apparatus the spring 66 is first approximately positioned in the bushing 63. Then after the bushing is in assembled association with the coil form and cross-head an arm 67 on a leader 68, is rotated by any suitable means to position slug 17*a* in the most advantageous position with respect to the coil form 64.

In assembly of the device, and particularly of those embodiments shown in Figs. 1 and 7, the spiral spring 21 or 48 is first mounted in the carrier member 18. The leader 19 is customarily straight as furnished by the manufacturer of the slugs, and it is inserted through the spring and bent to the appropriate end shape. It is desirable that this bend be so located that the slug 17 will be approximately tuned when the bent end or arm of the leader is near the center of available travel, thus assuring room for adjustment in either direction for greater flexibility.

Although I have described my invention in three different embodiments thereof, I am aware that extensive other departures may be made therefrom without departing from the spirit or scope of the idea.

I claim:

1. An apparatus for connecting a tuning slug movable in a coil to a member for moving the slug, wherein the slug has a stem extending therefrom and the moving member has an aperture for receiving the connector, comprising a helix having a plurality of convolutions some of which provide a support for the helix in the movable member, said stem on said slug being provided with an angular extension disposed and movable between and gripped by adjacent convolutions of the helix.

2. An apparatus for connecting a tuning slug movable in a coil to a member for moving the slug, wherein the slug has a stem extending therefrom and the moving member has an aperture for receiving the connector, comprising a spring helix having a plurality of closely spaced convolutions some of which provide a support for the helix in the movable member, said stem on said slug being disposed in the axis of the helix and a portion extending outwardly between and gripped by adjacent convolutions of the helix.

3. An apparatus for connecting a tuning slug movable in a coil to a member for moving the slug wherein the slug has a stem extending therefrom and the moving member has an aperture for receiving the connector, comprising a spring wire helix having a plurality of convolutions, means for gripping part of the convolutions of the helix in the movable member, said stem on said slug extending into the helix and being provided with an outwardly extending part disposed and movable between and gripped by adjacent convolutions of the helix, said outwardly extending portion being sufficiently long to permit it to be moved between the helix turns to adjust its position in the helix and the position of the slug in the coil.

4. An apparatus for connecting a tuning slug movable in a coil to a member for moving the slug wherein the slug has a stem extending therefrom and the moving member has an aperture for receiving the connector, comprising a spring wire helix having a plurality of convolutions, means for gripping part of the convolutions of the helix in the movable member, said stem on said slug extending into the helix and provided with a curved portion adjacent the end for engagement with the helix to limit movement of the stem in the helix and having a part extending outwardly between an adjacent pair of convolutions beyond the periphery of the helix, said helix engaging said outwardly extending portion to frictionally hold the same and permit the portion to be rotated around between the helix convolutions for longitudinal adjustment.

5. An apparatus for connecting a tuning slug movable in an inductance to a member for moving the same, wherein the member is provided with an opening and the slug with a stem, comprising coupling means disposed in said opening and a spring wire helix having closely spaced convolutions disposed in said coupling means, said slug stem extending into said helix and formed with a laterally extending part of sufficient length to extend between a pair of adjacent convolutions of the helix and beyond the periphery thereof to provide an outwardly extending portion to enable the stem to be rotated, said convolutions frictionally engaging said outwardly extending part with sufficient force to hold it in position and to permit it to be rotated around between the helix convolutions to provide for longitudinal adjustment of the slug relative to the support.

6. An apparatus for connecting a tuning slug movable in an inductance to a member for moving the same, wherein the member is provided with an opening and the slug with a stem, comprising coupling means disposed in said opening, and a thin walled parti-cylindrical portion having radially extending parts along one edge, the radially extending parts and the wall of said member diverging toward one end and arranged to be compressed when slid in said opening, and a spring wire helix having closely spaced convolutions disposed in and gripped by said coupling means, said slug stem extending into said helix and formed with a laterally extending part of sufficient length to extend between a pair of adjacent convolutions of the helix and beyond the periphery thereof to provide an outwardly extending portion to enable the stem to be rotated, said convolutions frictionally engaging said outwardly extending part with sufficient force to hold it in position and to permit it to be rotated around between the helix convolutions to provide for longitudinal adjustment of the slug relative to the support.

7. An apparatus for connecting a tuning slug movable in an inductance to a member for moving the same, wherein the member is provided with a circular opening having a slot at one side and the slug with a stem comprising coupling means arranged to be disposed in a said opening and including a thin walled member of cylindrical formation at one end having longitudinally and radially extending wings, said member having the wings and wall part diverging toward one end and arranged to be pressed together when inserted in said opening, and a spring wire helix having closely spaced convolutions disposed in and gripped by said coupling means, said slug stem extending into said helix and formed with a laterally extending part of sufficient length to extend between a pair of adjacent convolutions of the helix and beyond the periphery thereof to provide an outwardly extending portion to enable the stem to be rotated, said convolutions frictionally engaging said outwardly extending part with sufficient force to hold it in position and to permit it to be rotated around between the helix convolutions to provide for longitudinal adjustment of the slug relative to the support, said helix having an end convolution bent at an angle thereto and engageable with the stem to hold the intermediate portion of the stem under pressure.

REUBEN C. CARLSON.

REFERENCES CITED

The following references are of record in the file of this patent:

UNITED STATES PATENTS

| Number | Name | Date |
|---|---|---|
| 1,704,472 | Grandjean | Mar. 5, 1929 |
| 1,820,837 | Smalley | Aug. 25, 1931 |
| 2,399,957 | Tinnerman | May 7, 1946 |
| 2,539,172 | Andrews | Jan. 23, 1951 |
| 2,542,579 | Sanders | Feb. 20, 1951 |